United States Patent [19]
Hirsch et al.
[11] 3,715,670
[45] Feb. 6, 1973

[54] ADAPTIVE DC RESTORATION IN SINGLE-SIDEBAND DATA SYSTEMS

[75] Inventors: Donald Hirsch, Holmdel; David Adams Spaulding, Colts Neck, both of N.J.

[73] Assignee: Bell Telephone Laboratories, Incorporated, Murray Hill, N.J.

[22] Filed: Dec. 20, 1971

[21] Appl. No.: 209,654

[52] U.S. Cl. ......................325/331, 325/42, 325/50, 325/330, 329/104, 329/178, 333/18
[51] Int. Cl. ..............................................H04b 1/68
[58] Field of Search............325/49, 50, 42, 329–331; 329/104, 105, 109, 178; 333/18

[56] References Cited

UNITED STATES PATENTS 3,508,172 4/1970 Kretzmer et al.......................325/42

*Primary Examiner*—Albert J. Mayer
*Attorney*—R. J. Guenther et al.

[57] ABSTRACT

Single-sideband, as well as vestigial-sideband, transmission of synchronous digital data over channels of limited bandwidth, such as voice telephone channels, is facilitated by removing low-frequency signal energy at the transmitter to provide frequency space for a demodulating carrier component and by adaptively restoring such energy at the receiver after demodulation. A first transversal filter in series with, and a second transversal filter in parallel feedback relationship with a data detection circuit at the receiver are made jointly responsive to a common error component to both equalize and restore dc components adaptively to a received signal. More efficient bandwidth utilization than that achieved in systems using bandedge pilot ones is thereby attained.

5 Claims, 4 Drawing Figures

ADAPTIVE DC RESTORATION IN SINGLE-SIDEBAND DATA SYSTEMS

FIELD OF THE INVENTION

This invention relates to the transmission of digital data over channels of limited bandwidth and specifically to an improvement in the efficiency of bandwidth utilization of single-sideband and vestigial-sideband modulated data signals.

BACKGROUND OF THE INVENTION

Although vestigial-sideband (VSB) amplitude-modulation of voice-frequency carrier waves by digital data signals, as disclosed in U.S. Pat. No. 3,403,340 issued to F. K. Becker on Sept. 24, 1968, makes more efficient use of voiceband telephone channels that double-sideband (DSB) amplitude-modulation of these same data signals, it is possible to achieve still greater efficiencies by the use of single-sideband (SSB) amplitude-modulation. Digital data signals generally contain signal energy at zero frequency, i.e., direct current (dc). When such signals are modulated onto a carrier wave, dc energy is represented by the frequency of the carrier wave itself. In generating an SSB signal, however, it is usually necessary to suppress energy at the carrier frequency to ease the SSB filter requirements. One accepted way of suppressing such low-frequency energy, i.e., energy at and near dc, is to remove it from the baseband signal before modulation onto a carrier wave. This practice requires the presence at the receiver of a dc restoration circuit, e.g., a filter with a characteristic complementary to the high-pass filter which removed the low-frequency energy at the transmitter. Satisfactory operation of such a dc removal and restoral system requires accurate matching of the transmitter and receiver complementary filters because relatively small mismatches can create large degradations in performance. Such matching is difficult to achieve with fixed filters in practical transmission systems.

Another aspect of SSB modulation of synchronous digital data concerns the generation of a synchronous demodulating carrier wave. One way of recovering a synchronous local carrier wave which is accurate in frequency and can recover phase jitter is to transmit a carrier component with the data signal. Inasmuch as the band of low-frequency energy that can be reliably removed and restored with fixed filters is narrow, one practice has been to transmit along with the modulated data signal bandedge pilot tones bearing a simple relationship to the carrier frequency. The two tones must be spaced far enough in frequency from the data signal so that they can be filtered out at the receiver without interference from the data signal. Moreover, the presence of bandedge pilot tones reduces the proportion of the available bandwidth usable for transmitting data by several hundred Hertz.

It may be pointed out that synchronous demodulation is also required with VSB systems. SSB and VSB systems are sometimes referred to collectively as asymmetric sideband systems in contrast to symmetric DSB systems.

It is a principal object of this invention to provide precise adaptive dc restoration in data receivers.

It is an object of this invention to increase the efficiency of bandwidth utilization for the transmission of synchronous digital data by means of single-sideband, and other asymmetric-sideband, amplitude-modulation methods.

It is another object of this invention to improve dc restoration systems which are being employed in the transmission of digital data over voice telephone facilities.

It is a further object of this invention to permit the removal of sufficient low-frequency energy from digital data before modulation onto a carrier wave that a pure carrier component can be transmitted without sacrifice of transmission bandwidth and that the carrier with its channel-induced phase jitter can be recovered without interference from data-signal components.

SUMMARY OF THE INVENTION

According to this invention, a relatively large amount (compared to prior art systems using fixed filters) of low-frequency energy is removed from synchronous digital data signals before modulation onto a carrier frequency. The resultant balanced double-sideband and signal with carrier suppressed is filtered to remove one of the sidebands. The desired sideband, together with a carrier component reinserted into the frequency space carved out of the base-band data signal in the neighborhood of direct current, is transmitted to a data receiver over a channel susceptible to time-varying phase shift and frequency offset.

The composite received signal is passed through a bandpass filter to remove out-of-band noise, is stripped of the carrier frequency component, is demodulated to baseband, passed through a baseband filter, and is combined with a filtered version of the recovered data signal to form an input to a data detector which creates the output data signal. The dc energy removed from the data signal before transmission is restored by feeding the recovered data signal back to the input of the data detector through a feedback filter broadly comprising a cascade of a low-pass filter and a filter whose characteristic is the complement of the high-pass filter which removed the dc energy at the transmitter. The baseband in-line and composite feedback filters are made dynamic and adaptive by casting each of them in transversal filter form with all tap attenuators controlled by a common error signal. The in-line baseband filter effectively performs an equalizing function by controlling intersymbol interference. The feedback filter assumes the complement of the characteristic of dc removal filter and restores dc and other low-frequency components to the signal upon which data decisions are based.

The carrier component inserted in the vacated low-frequency data energy slot at the transmitter is readily employed for demodulation by conventional means at the receiver to provide a demodulating carrier wave which precisely tracks the frequency offset and phase jitter of the transmission channel.

An important feature of this invention is that the adaptive filters in an asymmetrical sideband system can be constructed in the well-known transversal filter from. Each transversal filter, capable of achieving an arbitrary response function in the time domain, comprises a synchronously tapped delay line, an adjustable attenuator connected to each tap, and a combining circuit.

A further feature is that the absence of data energy in the vicinity of the transmitted carrier component permits the recovery of attendant phase jitter without interference from the data signal itself. As a consequence phase jitter accompanying the data signal is largely canceled out in the demodulation process by phase jitter associated with the recovered carrier component.

A still further feature is that both equalizer and restoration functions are accomplished adaptively in response to a common error signal.

DESCRIPTION OF THE DRAWING

The above and other objects and features of the invention will be understood and appreciated from the following detailed description and the drawing in which.

DESCRIPTION OF THE PREFERRED EMBODIMENT

Figure 1:
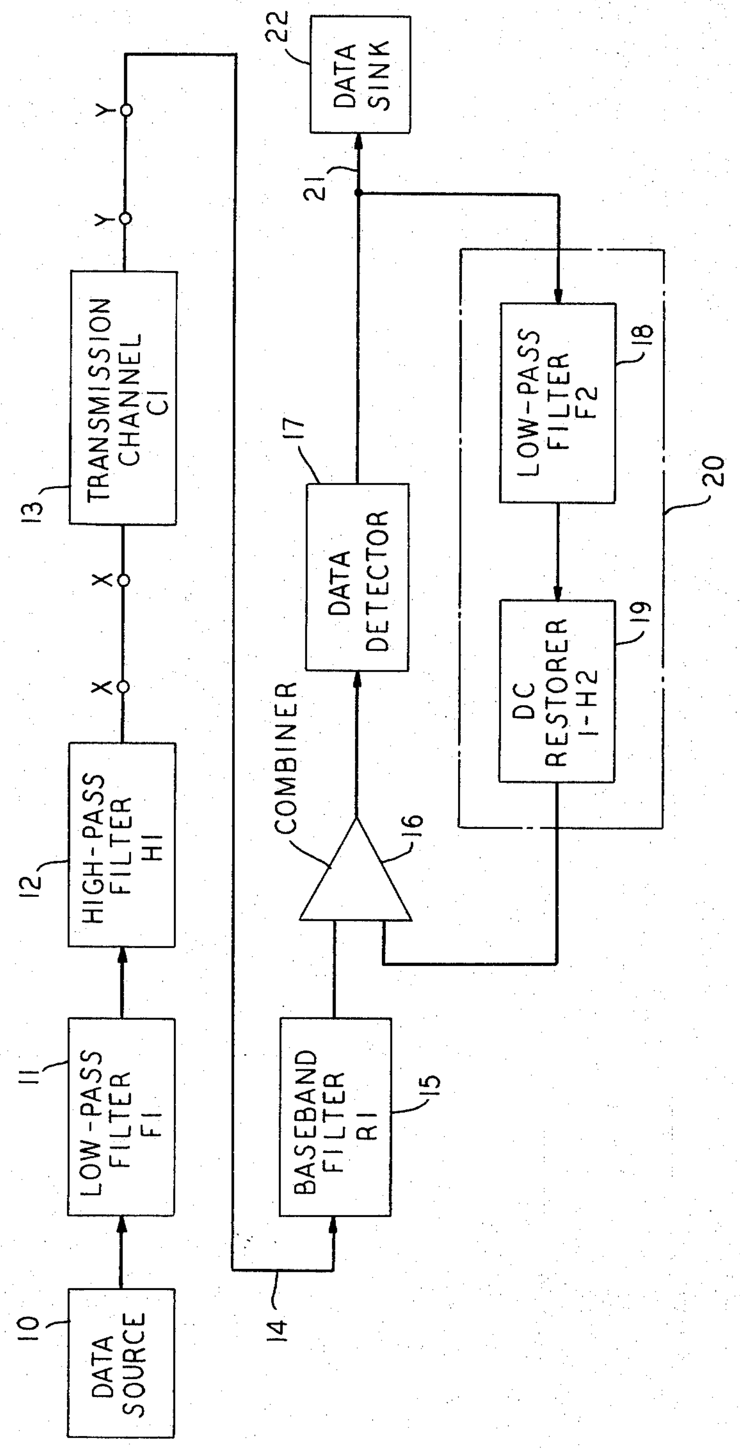
FIG. 1 PRIOR ART
FIG. 1 is a block diagram of a data transmission system of the prior art which uses fixed dc removal and restoration filters to transmit digital data signals over transformer-coupled, i.e., dc blocking, baseband channels.

FIG. 1 is a block diagram of a representative arrangement for the transmission of digital data signals having substantial energy components in the vicinity of direct current over a baseband channel which effectively blocks the transmission of direct current due to the presence of capacitive or transformer coupling in the channel.

The conventional transmission system employing dc removal, as shown in FIG. 1, comprises digital data source 10, transmitting low-pass filter 11 having a transfer function $F_1$ with an upper-frequency limit equal to the reciprocal of the data symbol interval T; high-pass filter $H_1$ with a lower-frequency limit, depending on the nature of the channel, on the order of 5 to 10 Hz; transmission channel 13 having a transfer characteristic $C_1$ which does not pass direct current; receiving baseband filter 15 having a transfer function $R_1$; data detector 17 for making data decisions; data sink 22; composite feedback filter 20 including low-pass filter 18 having the transfer function $F_2$ and dc restorer 19 having a transfer function of the form $(1-H_2)$; and combiner 16 for adding the feedback signal to the incoming signal.

In operation an input data sequence $\{a_i\}$ from source 10 is filtered by low-pass filter 11 to limit the signal to the available transmission band while keeping individual data pulses from interfering with each other. The data sequence is further filtered in high-pass filter 12 to remove signal energy near direct current. The data signal, bandlimited and free of energy around direct current, is transmitted through the series combination of channel 13, conductor 14 and receiving baseband filter 15. Channel 13 is assumed to be incapable of transmitting direct current. The received baseband signal is added in combiner 16 with a filtered version of an output data sequence $\{b_i\}$ from data detector 17 to form the input to data detector 17. In order to make the output data sequence $\{b_i\}$ equal the input data sequence $\{a_i\}$, the transfer function from the output of data source 10 to the output of combiner 16 must be $$G=F_1H_1C_1R_1+F_2(1-H_2)=F_1H_1C_1R_1+F_2-F_2H_2 \quad (1)$$

On the assumption that $C_1R_1=1$, $F_1=F_2$ and $H_1=H_2$ the transfer function becomes $G=F_1$.

Since it was postulated that the transfer function $F_1$ filters data sequence $\{a_i\}$ to remove intersymbol interference, the input to data detector 17 is an ideal data signal free of intersymbol interference but with dc energy completely restored. The detected data sequence $\{b_i\}$ is exactly equal to the transmitted data sequence $\{a_i\}$. The dc energy has been restored by reason of having passed the recovered data from output junction 21 through filters 18 and 19.

Accurate restoration of dc energy, which is required when significant amounts of energy in the vicinity of direct current have been removed, presupposes that transfer function $H_2$ and $F_2$ accurately match transfer functions $H_1$ and $F_1$ and that the produce $C_1R_1$ equals unity. The conventional dc removal and restoral system using fixed filters at both transmitter and receiver cannot consistently attain these objectives.

Figure 2A:
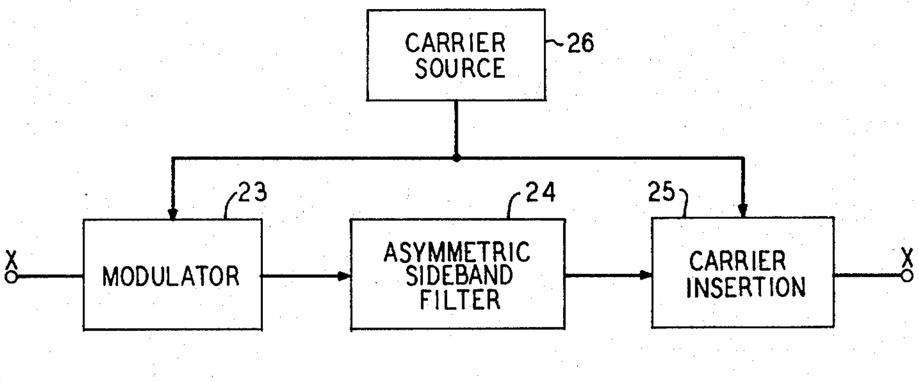
FIG. 2A and FIG. 2B are block diagrams of modulation and demodulation apparatus by means of which the date transmission system of FIG. 1 is transformed into a passband asymmetric sideband data transmission system using fixed dc removal and restoration filters.
Figure 2B:
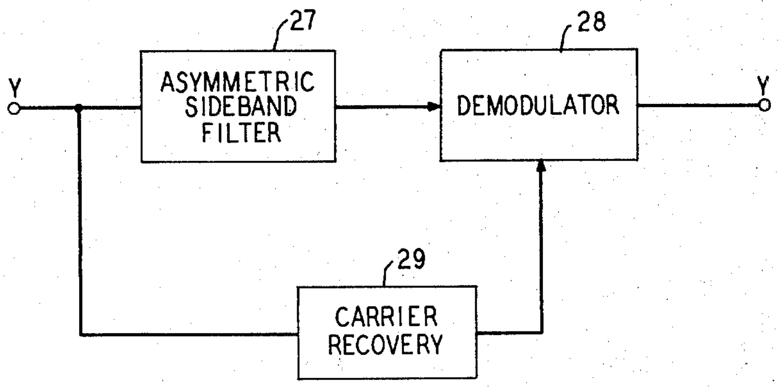

FIG. 2A and 2B, taken together and connected in FIG. 1 at positions X—X and Y—Y, respectively, transform the baseband data transmission system of FIG. 1 into a passband system, which is more commonly encountered in practical transmission channels, such as the voiceband telephone network.

With the modulation circuit of FIG. 2A inserted at points X—X in FIG. 1 between high-pass filter 12 and transmission channel 13, now assumed for concreteness to have a passband on the order of 100 to 3,000 Hz, the baseband data signal after band-limiting in low-pass filter 11 and low-frequency energy removal in high-pass filter 12 is applied to modulator 23 for translation to a passband centered on a carrier frequency generated in carrier source 26. The carrier frequency for SSB modulation within the telephone voiceband is advantageously located near the upper bandedge of 3,000 Hz. For VSB modulation a carrier frequency near 2,800 Hz has been found to be appropriate.

The direct result of the modulation process is a double-sideband signal with the carrier suppressed. However, for bandwidth conservation the upper sideband is partially (in the VSB case) or completely (in the SSB case) suppressed in asymmetric sideband filter 24. The output of this filter in turn is combined with a carrier-wave frequency component in carrier insertion block 25. Inasmuch as low-frequency components have been suppressed from the baseband signal, the insertion of the carrier component does not result in any mutual interference between the transmitted data and carrier. The output of block 25 is applied to transmission channel 13 in FIG. 1.

When the demodulation circuit of FIG. 2B is inserted at points Y—Y in FIG. 1 between the output of channel 13 and the input of baseband receiving filter 15, the carrier component is separated from the remainder of the received signal in carrier recovery circuit 29, which may advantageously be a phase-locked loop circuit. The output of carrier recovery circuit 29 is an accurately phased demodulating carrier wave following channel-induced frequency offset and phase jitter without interference from the data signal.

The information bearing portion of the received signal is shaped and the noise is limited in asymmetric sideband filter 27, which closely matches filter 24 in FIG. 2B. The output of filter 27 is product modulated with the carrier frequency from circuit 29 in demodulator 28 to restore a baseband data signal with a low-frequency notch therein. This signal is operated on by the equalization and dc restoration circuits of FIG. 1 in the same manner as previously described in connection with the baseband system of FIG. 1.

Inasmuch as the exact characteristics of the passband channel are unknown and time varying, adaptive equalizing filters are required in the receiver. Accordingly, this invention provides adaptive filters in the receiver portion of a data transmission system as described in the remainder of this specification.

Figure 3:
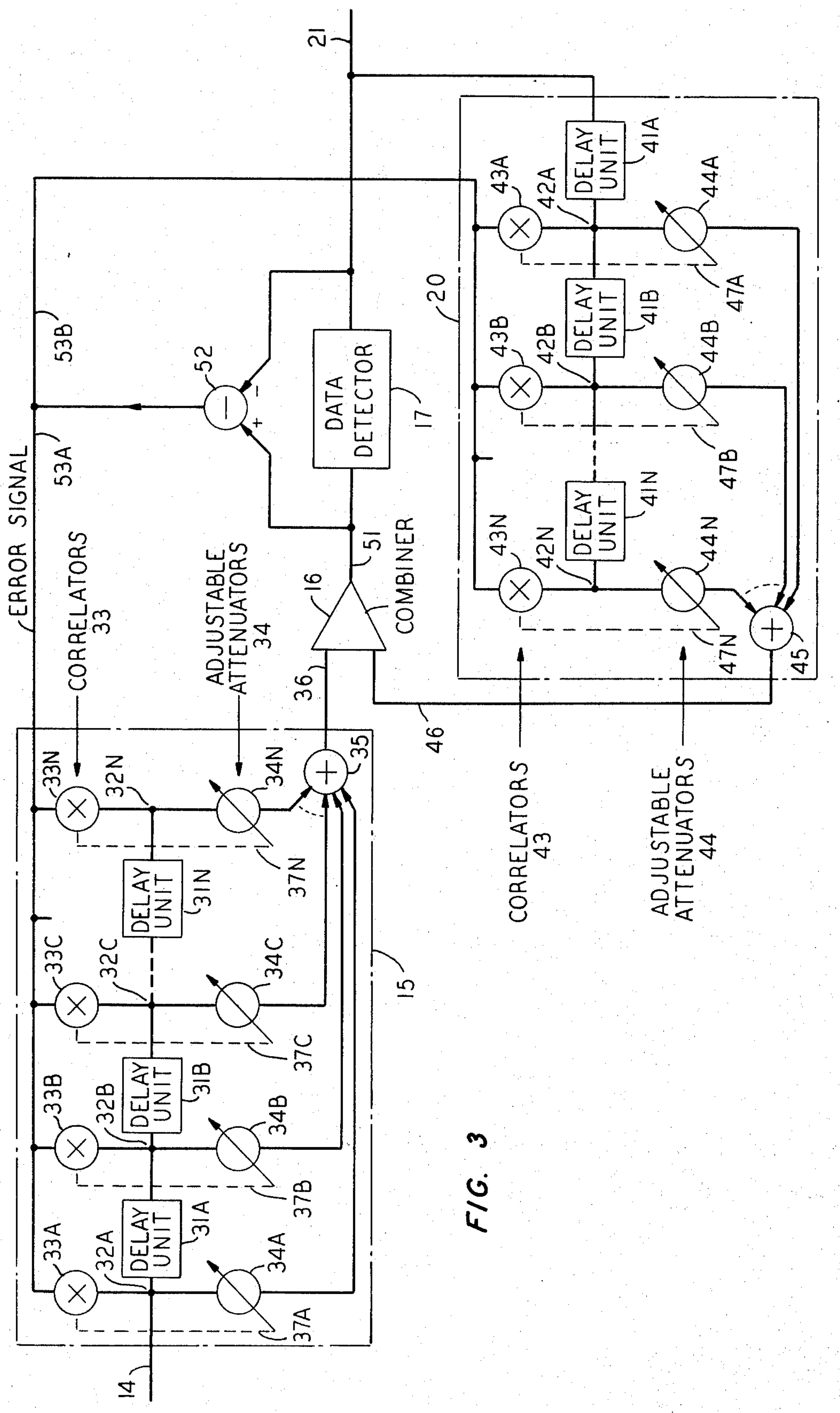
FIG. 3 is a block schematic diagram of the adaptive filtering and dc restoration apparatus of this invention as applied to an asymmetric sideband data transmission system.

FIG. 3 is a block schematic diagram of an adaptive equalizer and dc restoration arrangement to replace the elements shown in FIG. 1 between conductor 14 and junction 21. The functions of fixed filters 15 and 20 in FIG. 1 re replaced by adaptively adjustable transversal filters controllable in accordance with a common mean-square error signal developed in subtractor 52 from the difference between the respective input and output of data detector 17. The input of detector 17 is a signal obtained from the combination of the received baseband-filtered signal and the feedback-filtered detector output. The output of detector 17 is the quantized signal resulting from the data decision process of detector 17.

Each of blocks 15 and 20 comprises a plurality of delay units 31 or 41 (three are shown as 31A, 31B, and 31N in block 15 or 41A, 41B, and 41N in block 20 for illustrative purposes) separated by taps 32 or 42 (32A, 32B, 32C, and 32N in block 15; 42A, 42B, and 42N in block 20); a plurality of attenuators 34 or 44 (34A, 34B, 34C and 34N in block 15; 44A, 44B, and 44N in block 20), adjustable through positive and negative values, connected to each tap; a plurality of correlators 33 and 43 (33A, 33B, 33C and 33N in block 15; 43A, 43B and 43N in block 20); and a summation circuit 35 (block 15) or 45 (block 20) for forming a composite output signal from the selectively attenuated tap signals. The use of the suffix N indicates that it is appropriate to employ as many of each element as may be required for desired levels of precision.

The operation of block 15 as an equalizer which removes intersymbol interference is well known from U.S. Pat. No. Re. 27,047 issued to R. W. Lucky on Feb. 2, 1971. Samples of the received signal from input conductor 14 appearing at taps 32A through 32N at integral multiples of the data symbol interval T are selectively attenuated and inverted where necessary by attenuators 34A through 34N under the control of correlators 33A through 33N in such a way that the composite output at summer 35 is compensated for interfering signal components from adjacent time slots. Correlators 33 combine the functions of multiplying the error signal from subtractor 52 on lead 53A with the several tap signal samples and of integrating successive products to develop an averaged control signal. Thus, attenuator settings are not erratically perturbed by noise, for example. Control links 37A through 37N between correlators 33 and attenuators 34 are shown as broken lines to indicate either electrical or mechanical connection depending on the particular tap-gain implementation employed. The equalized output of block 15 appearing on lead 36 is applied to one input of combiner 16.

The operation of block 20 is similar to that of block 15 and responds to the same error signal made available on lead 53B from the output of subtractor 52. However, the signal which block 20 operates on is a noise-free quantized digital output from data detector 17. Moreover, block 20 is in feedback relationship with detector 17 from which the mean-square error signal is derived. Accordingly, attenuators 44 are adjusted to provide an output on lead 46 which, when combined with the equalized output of block 15 on lead 36 in combiner 16, precisely restores the low-frequency energy removed from the transmitted baseband data signal. The arrangement constitutes an adaptive dc and low-frequency restoration circuit employing decision feedback.

An asymmetric data modulation system employing the adaptive decision feedback arrangement of this invention achieves a significant improvement in bandwidth utilization over prior systems which necessitated the dedication of critical frequency space for pilot tones to provide a demodulating carrier wave at the receiver which accurately tracks channel-induced frequency offset and phase jitter.

While this invention has been described in terms of a specific illustrative embodiment, it will be apparent to those skilled in the data transmission art that it is susceptible of many modifications within the scope of the disclosed principle of operation.

What is claimed is:

1. An adaptive dc restoration circuit for digital data signals from which low-frequency energy has been removed for bandwidth conservation purposes comprising data detection means having an input and an output for transforming input signal samples of arbitrary amplitude into output signals of the most probable of preselected discrete amplitudes, error means responsive to the difference between the input and output of said data detection means for generating an error signal, transversal filter means having a plurality of adjustable attenuating means, and associated correlating means responsive to said error signal for controlling said attenuating means at synchronously spaced taps thereon and a summation circuit for combining selectively attenuated tap signal samples, means for applying output signals from said detector means to said transversal filter means, and means for combining signals from the summation circuit of said transversal filter means with received data signals to form an input signal with low-frequency energy restored for said detection means.

2. The combination defined in claim 1 in which said transversal filter includes a summation circuit for selectively attenuated outputs of all taps and in which the output of said summation circuit is combined with a received data signal deficient in low-frequency energy to provide an input signal for said data detection circuit.

3. The combination defined in claim 1 in which a further transversal filter having adjustable attenuators at synchronously spaced taps thereon is connected in series with said data decision circuit to equalize received data signals and further means to correlate said error signal with signal samples at each tap on said further transversal filter.

4. In combination with a receiver for an asymmetric-sideband amplitude-modulated synchronous data signal from which low-frequency energy has been removed to allow frequency space for transmission of a separable carrier component susceptible of recovery without interference with data-signal components:

a data detection circuit, a transversal filter having adjustable attenuators at synchronously spaced taps thereon in parallel feedback relationship with said detection circuit, means for deriving an error signal from the difference between the input and output of said detection circuit, and means for correlating said error signal with the signal samples at each tap on said transversal filter to generate control signals for adjusting associated attenuators and thereby to restore said low-frequency energy to a received data signal.

5. In combination with a receiver for asymmetric-sideband synchronous data signals from which low-frequency energy has been removed to allow frequency space for transmission of a carrier component, a data detection circuit, first and second transversal filters having adjustable attenuators at synchronously spaced taps thereon and a summation circuit for selectively attenuated tap signals, means for connecting said first transversal filter in series with said detection circuit for equalization purposes, means for connecting said second transversal filter in parallel feedback relationship between the respective output and input of said detection circuit for low-frequency energy restoral purposes, means for deriving an error signal from the difference between the input and output of said detection circuit, and means for correlating said error signal with signals at each tap of said first and second transversal filters to obtain control signals for adjusting associated attenuators to minimize said error signal.

* * * * *